United States Patent [19]

Vogel et al.

[11] Patent Number: 4,556,835
[45] Date of Patent: Dec. 3, 1985

[54] OPERATING MECHANISM FOR MOVABLE PARTS, ESPECIALLY FOR SLIDING ROOFS AND SLIDING/LIFTING ROOFS

[75] Inventors: Wolfgang Vogel, Gauting; Albert Zintler, Fürstenfeldbruck, both of Fed. Rep. of Germany

[73] Assignee: Webasto-Werk W. Baier GmbH & Co., Fed. Rep. of Germany

[21] Appl. No.: 530,714

[22] Filed: Sep. 9, 1983

[30] Foreign Application Priority Data

Sep. 22, 1982 [DE] Fed. Rep. of Germany ....... 3235053
Jul. 5, 1983 [DE] Fed. Rep. of Germany ....... 3324107

[51] Int. Cl.⁴ .............................................. G05B 1/06
[52] U.S. Cl. .................................. 318/663; 318/624; 318/678
[58] Field of Search ....................... 296/220, 219, 216; 318/624, 663, 681, 678

[56] References Cited

U.S. PATENT DOCUMENTS

3,736,486 5/1973 Gould et al. ..................... 318/681
3,964,784 6/1976 Prechter et al. ................ 296/220 X Primary Examiner—William M. Shoop, Jr.
Assistant Examiner—Saul M. Bergmann
Attorney, Agent, or Firm—Sixbey, Friedman & Leedom

[57] ABSTRACT

An operating system for movable parts for the selective closing or exposing of openings, especially for sliding roofs and sliding/lifting roofs of motor vehicles. The operating mechanism has a motor drive for the movable part and an actuating member for starting the drive, if required. In order to facilitate, especially, the bringing of the movable part into intermediate positions, the actuating member is developed as a desired-value transmitter for the position of the movable part, and the drive is part of a control circuit which compares the position selected at the desired-value transmitter with the actual position of the movable part and adjusts the movable part until the deviation has become zero.

30 Claims, 13 Drawing Figures

$$\frac{U_N}{U_B} = \frac{R2}{R1+R2}$$

OPERATING MECHANISM FOR MOVABLE PARTS, ESPECIALLY FOR SLIDING ROOFS AND SLIDING/LIFTING ROOFS

BACKGROUND AND SUMMARY OF THE INVENTION

This invention relates to an operating mechanism for movable parts for the selective closing or exposing of openings, especially for sliding roofs and sliding/lifting roofs of motor vehicles, having a motor drive for the movable part and an actuating member for starting the drive when required.

In the known mechanisms of this type (DE-PS No. 21 00 336 corresponding to U.S. Pat. No. 3,702,430, and DE-PS No. 19 06 084), the actuating member is a switch or a group of switches by means of which the drive can be switched on or off in the desired operating direction. In the case of sliding roofs and sliding/lifting roofs, additional limit switches are provided, as a rule, which stop the movable part (the cover) in the closed position, in the fully retracted position or in a fully tilted-out position. Nevertheless, the operation is awkward. Especially the stopping of the cover in intermediate positions presents problems. For example, in order to bring the cover of a sliding roof from the closed position to a partially opened position, the actuating switch must be pressed and be held in the pressed position until the cover has reached the desired intermediate position. When and whether this is the case, can only be determined by the driver by directly observing the cover, which requires that the driver look away from the road.

The invention is based on the objective of constructing an operating mechanism of the initially described type which can be operated more easily and which permits a precise movement into desired intermediate positions without the requirement of observing the movable part.

According to the invention, this objective is achieved by the fact that the actuating member is formed as a desired-value transmitter for the position of the movable part, and the drive is part of a control circuit which compares the position chosen at the desired-value transmitter with the actual position of the movable part and adjusts the movable part until the deviation has become zero. In the case of the operating mechanism according to invention, the actuating member must only be brought into a position that corresponds to the desired position of the movable part. Via the control circuit, the drive will then automatically be caused to bring the movable part into the desired position and arrest it there. The movable part itself does not have to be observed in this case. A repeated actuating is not necessary, such as was required in the known mechanism, when the switch was released before the desired intermediate position had been reached or after this position had been exceeded. In the case of sliding roofs of motor vehicles or similar devices, any distraction of the driver is avoided.

In order to further facilitate the adjustment, the actuating member advantageously has a selector lever located in the normal field of vision of the operating person to which an indicating device is expediently related so as to show the adjusting range of the movable part. A mechanical catch is also provided, advantageously, that interacts with the desired-value transmitter of its selector lever in order to enable the driver to locate at least one indicated position, such as the closed position of the movable part, without having to look away from the roadway.

The movable part can be given the ability to carry out at least two different types of adjusting movements, such as, in the case of a sliding/lifting roof, to carry out a sliding movement and a pivoting or tilting-out movement. In the case of such a design, a selector switch may be provided for the preselection of the type of adjusting movement and, by means of a single selector lever, the desired position can be selected in the course of all forms of the adjusting movement. Corresponding to a modified embodiment, the design may be such that the type of adjusting movement of the movable part can be selected by the direction of the adjustment of the selector lever with respect to a predetermined starting position. The indicating device is preferably provided with additional elements for indicating the selected type of adjusting movement, and the selector lever may expediently itself, at the same time, form a part of the indicating device. An especially clear indication will be received when the selector lever can be adjusted with respect to one or several fixed wedge representations symbolizing the desired positions.

In accordance with a further feature of the invention, the control circuit has a three-point transfer characteristic with a hysteresis for avoiding an undesired response of the control circuit in the case of slight actual-value/-desired-value deviations. The control circuit may have a coarsely regulating and a precisely regulating circuit which may, for example, interact with a motor that can be switched to two different speeds, where the switching from the coarsely regulating to the precisely regulating circuit takes place automatically in order to, among other things, carry out precise positioning.

In this manner, wind forces may be counterbalanced, for example, in the case of a sliding or sliding/lifting roof. A coarse or precise regulating with respect to the position may also take place in connection with a regulating of the motor speed. The desired-value selection and the actual-value detection may basically be selected to be analog or digital. An analog actual-value detection has the advantage that the actual position remains stored, without additional expenditures, even in the case of power failure. Especially suited for an analog desired-value selection and/or actual-value detection are rotary or sliding potentiometers. For a digital actual-value detection, a digital-position transmitter having a count-up/count-down device at the output side is suitable. The control circuit also may be developed to be analog, digital or mixed: analog/digital. Digital-to-analog converters or analog-to-digital converters may possibly be provided in order to permit digital data transmitters to work with an analog control circuit or, vice versa, to permit analog data transmitters to work with a digital control circuit.

In a further development according to the invention, at least one additional transmitter is provided for determining a fixed desired-value, as well as a logic circuit that responds to predetermined conditions for switching from the adjustable desired-value transmitter to the fixed-value/desired-value transmitter. The logic circuit may, for example, respond to the turning-off of the ignition or to a rain sensor in order to automatically bring a sliding or sliding/lifting roof into the closed position. Vice versa, the logic circuit may be actuated by a jamming-protection sensor in order to bring the cover of a sliding or sliding/lifting roof into the end positions of the opening or into one of the end positions of the opening, as soon as, during a cover-adjusting movement, a counterforce is experienced that exceeds the adjusting force that is to be expected normally.

In the case of an arrangement with analog transmitters and a digital signal evaluation, a single analog-to-digital converter may expediently be associated jointly with the transmitters, and the transmitters may be connected to the joint analog-to-digital converter in time-division multiplex operation.

The desired-value transmitter potentiometer may be provided with an additional fixed tap for a signal corresponding to the predetermined starting position. A voltage divider with a resistance that is low in comparison to the combined resistance of the potentiometer may be connected in parallel to such a potentiometer, while the fixed tap of the potentiometer is connected with a voltage-divider tap for the starting-position signal in an electrically conductive manner. Such a design results in a particularly simple mounting and permits a simple adaptation of the characteristic adjusting line to the respective requirements.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
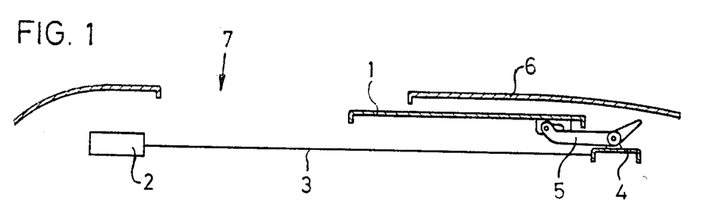
FIG. 1 is a diagrammatic view of a sliding/lifting roof of a motor vehicle with the cover being retracted.
Figure 2:
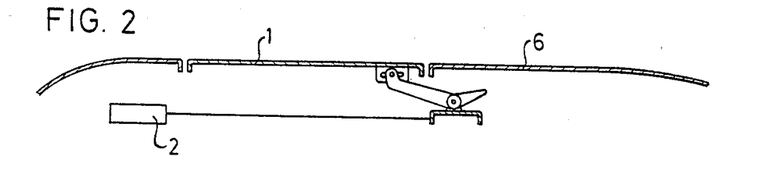
FIG. 2 shows the sliding/lifting roof according to FIG. 1, in the closed position.
Figure 3:
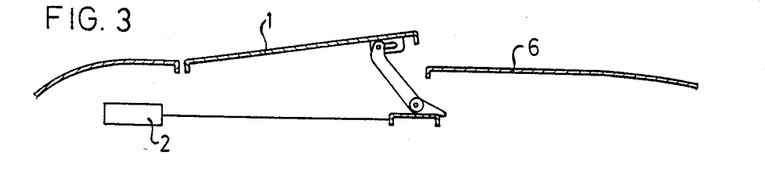
FIG. 3 shows the sliding/lifting roof according to FIG. 1, with the cover being tilted out.

The sliding/lifting roof shown in diagrammatic form in FIGS. 1 to 3 had a cover 1 which is adjustable by means of an electric motor 2 that can be reversed with respect to the direction of its rotation, via one or several transfer elements 3, expediently in the form of pressure-resistant cables, via a transport bridge 4 and a tilt-out mechanism 5. In the operating condition according to FIG. 1, the cover 1 is retracted under a stationary part 6 of the roof in order to expose an opening 7 in the roof.

In the position according to FIG. 2, the cover 1 closes the opening 7 in the roof. By means of a further advancing of the transport bridge 4, starting from the closed position according to FIG. 2, the tilt-out mechanism 5 is caused to lift the rear edge of the cover 1 above the stationary part 6 of the roof, while swivelling the cover 1 around an axis located near the front edge of the cover. Means for achieving the described sliding and lifting motions are known and do not, per se, form part of this invention.

Figure 4:
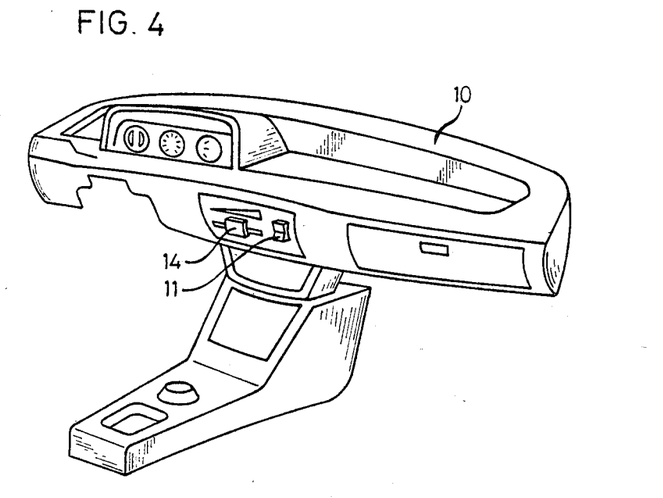
FIG. 4 is a perspective view of the dashboard of a motor vehicle with the desired-value transmitter for the sliding/lifting roof according to FIGS. 1 to 3.

The motor 2 is disposed in a control circuit described in detail below, and the desired position of the cover can be indicated by means of a desired-value transmitter of the type shown in FIGS. 4 and 5. In the case of this embodiment, the desired-value transmitter is integrated into the dashboard 10 of the motor vehicle in such a way that it is located within the field of vision of the driver. It has a flip switch 11, by means of which it may be selected whether the cover 1 should be tilted out or slid. Symbols 12, 13 (FIG. 5) are associated with the movement directions of the flip switch 11, with said symbols 12, 13 showing clearly how said flip switch 11 must be operated for changing over from a tilting-out mode of operation to a sliding mode of operation and vice versa.

Also, part of the desired-value transmitter is a selector lever 14, which, in this case, can be moved in a horizontal direction, for selecting the desired displacement position of the cover 1, in the case of both types of cover movements that can be selected by means of the flip switch 11. The selector lever 14 can be adjusted with respect to a fixed wedge representation symbolizing the desired-position range and, thus, itself, also forms a part of the indicating device for the desired position. In FIG. 5, the left end position of the selector lever 14 corresponds to the closed position according to FIG. 2, while the right end position, depending on the position of the flip switch 11, indicates either the fully tilted-out position (FIG. 3) or the fully retracted position (FIG. 1) of the cover 1. The position of the selector lever 14 shown in FIG. 5 corresponds to approximately a 40% opening of the cover 1 in the sliding or the tilting-out direction.

Figure 5:
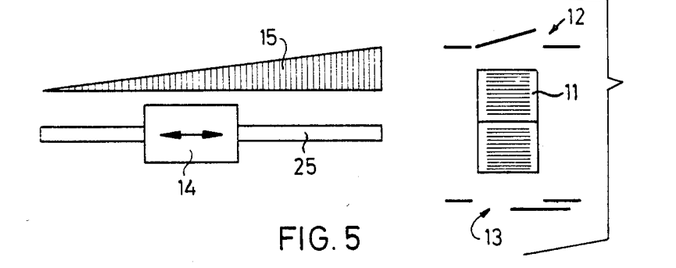
FIG. 5 is a larger-scale diagrammatic view of the desired-value transmitter according to FIG. 4.
Figure 6:
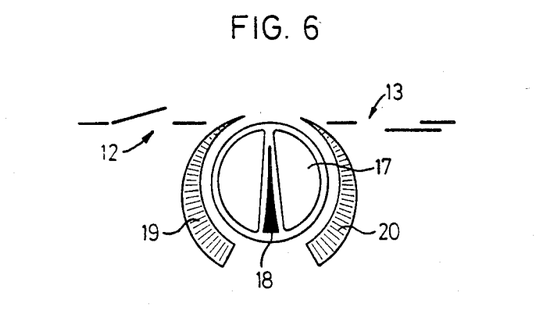
FIGS. 6 and 7 show modified embodiments of the desired-value transmitter.

While, in the case of the embodiment according to FIG. 5, the selector lever 14 is formed as a slide and the additional flip switch 11 is provided, FIG. 6 shows a modified embodiment where the selector lever is actuated via a turning knob 17. The turning knob 17, starting from the position according to FIG. 6, may selectively be turned clockwise and counterclockwise. The indicating symbols 12, 13 show that, by means of a counterclockwise turning, a tilting-out movement is selected, and that, by means of a clockwise turning, on the other hand, a sliding movement of the cover is selected. The extent of these movements is indicated by the position of an arrow-shaped symbol 18 on the turning knob 17 with respect to the actuate wedge representations 19 and 20. In this manner, the additional flip switch 11 of FIG. 5 will not be necessary.

Figure 7:
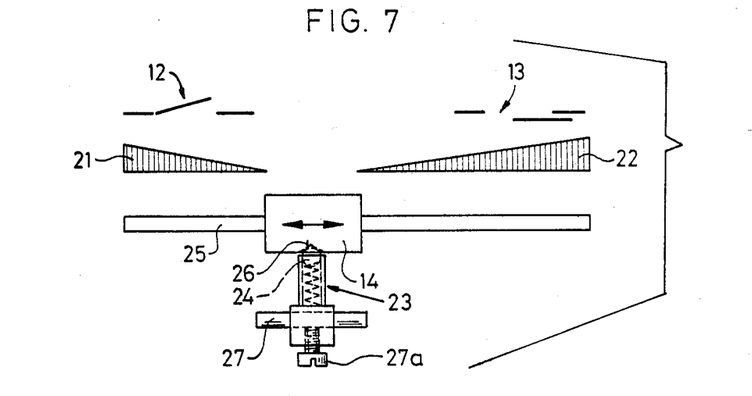

Another embodiment of the desired-value transmitter, which also does not require the flip switch 11, is shown in FIG. 7. There a selector lever 14, like that of FIG. 5, is provided which, however, has a starting position, corresponding to the closed position of the cover, from which it may be moved selectively to the left and to the right. A sliding of the lever 14 to the left, as represented by the symbol 12, causes a tilting-out of the cover 1 by a distance that is indicated by a wedge 21, whereas, by a sliding of the selector lever 14 to the right, in the manner indicated by the symbol 13, the cover 1 can be retracted by a distance indicated by a wedge 22. The selector lever 14 protrudes through a slot 25 of the dashboard 10, and, in order to enable the driver to recognize the starting position of the selector lever 14, that corresponds to the closed position of the cover 1, without having to look at the selector lever and/or in order to precisely identify this position, a spring catch 23 is provided having a ball 24 that is spring biased into a recess 26 in the selector lever 14 when said selector lever 14 reaches its starting position (FIG. 7). The spring catch 23 can be adjusted in the sliding direction of the selector lever 14. For this purpose, a guide rod 27, for example, is provided that extends in parallel to the slot 25, with said spring catch 23 being able to be slid on said guide rod 27 and being able to be fixed on said guide rod 27 by means of a clamping screw 27a. Naturally, other indicated positions may be shown in the same or a similar manner.

Figure 8:
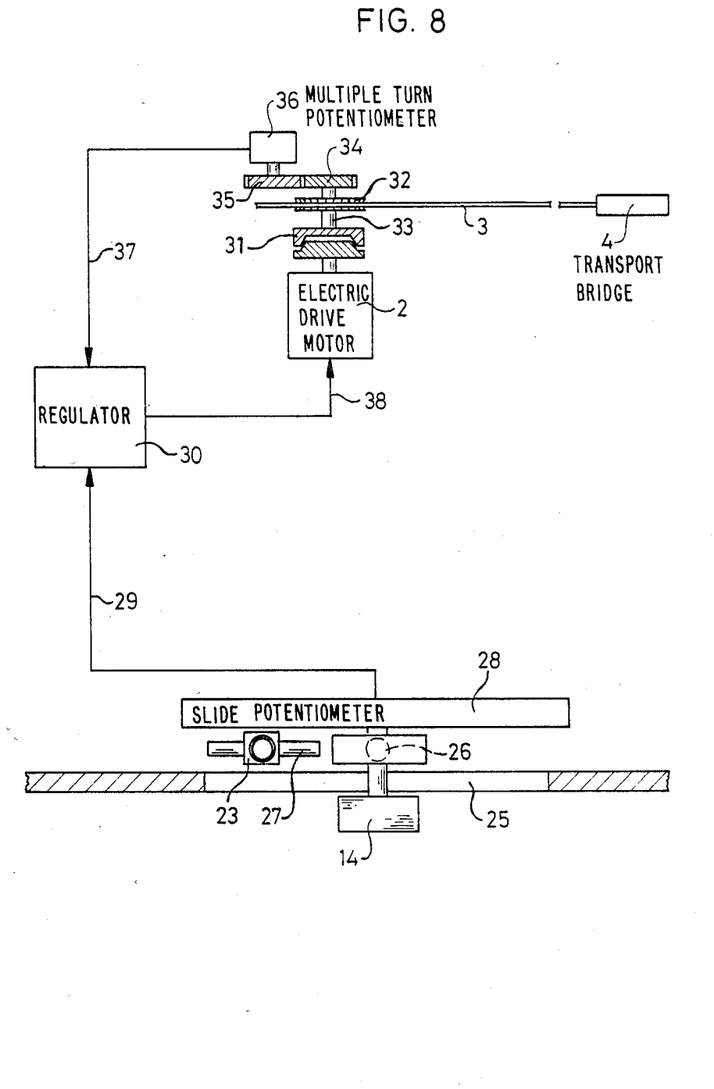
FIG. 8 shows a diagrammatic view of the operating mechanism provided for the sliding/lifting roof.

The manner in which selector lever 14 produces the noted operation of the cover will now be described with reference to FIG. 8. As can be seen, the end of lever 14, which passes through the dashboard slot 25, is coupled to the slide-type potentiometer 28. The potentiometer 28 converts the position of the selector lever 14, as adjusted by the driver, into an electrical desired-value signal which is fed to a regulator 30 via a line 29. The transfer element 3 is driven by an electric motor 2 via a sliding clutch 31 and a pinion 32. A toothed wheel 34 is disposed on the pinion shaft 33, with said toothed wheel 34 mating with a toothed wheel 35 on a control shaft of a multiple-turn potentiometer 36. The potentiometer 36 converts the actual position of the cover 1 into an electrical actual-value signal which is directed to the regulator 30 via a line 37.

The desired position of the cover 1 is adjusted at the selector lever 14. In this case, the selector lever 14 adjusts the potentiometer 28. If the desired-value signal transmitted by the potentiometer 28 to the regulator 30 deviates from the actual-value signal delivered by the potentiometer 36, the regulator 30, via a line 38, furnishes a drive signal to the motor 2. The motor 2 will drive the cover 1 via the sliding clutch 31 and the pinion 32. On the basis of the adjustment of the cover, the actual-value signal delivered by the potentiometer 36 to the line 37 will change. As soon as the latter is made to conform with the desired-value signal of the potentiometer 28, the drive signal on the line 38 becomes zero and the motor 2 stops, so that the cover 1 is arrested in the position indicated by means of a selector lever 14. The FIGS. 5 and 6 embodiments function in an analogous manner; in FIG. 5, switch 11 being connected so as to reverse the direction in which motor 2 drives element 3, relative to the closed position, and FIG. 6 using a rotary-type potentiometer instead of slide-type 28. The driver can easily read the position of the cover by looking at the wedges 15 or 19, 20 or 21, 22. He does not have to turn his head and view the cover in order to be certain of the intermediate position or end position of the cover 1.

Figure 9:
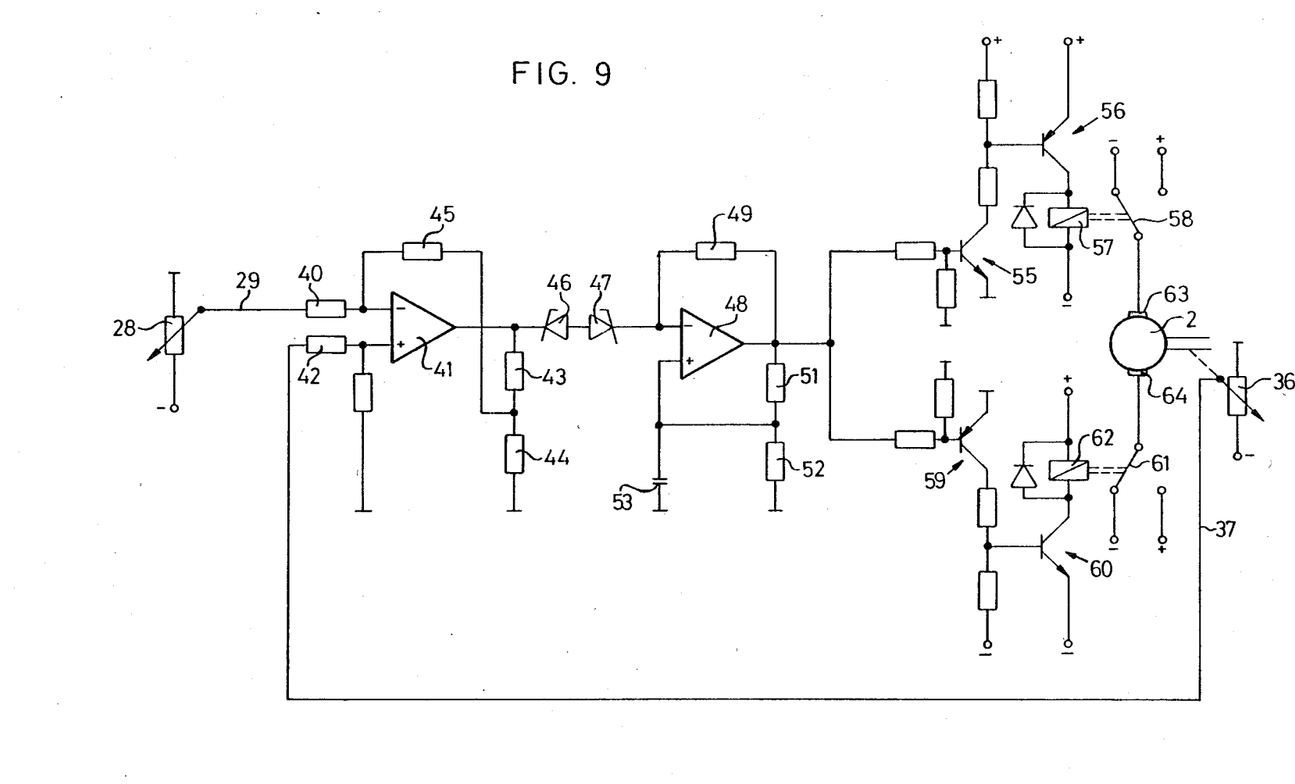
FIG. 9 shows a schematic diagram of an analog control circuit.

FIG. 9 shows a preferred embodiment of an analog control circuit. A circuit of this type is known (Elektronik, Volume 2, 1982, pages 67 and 68), so that a short explanation will be sufficient. The desired-value signal goes from the potentiometer 28, via a line 29 and a resistor 40, to an inverting inlet of an operation amplifier 41, at the non-inverting inlet of which the actual-value signal from potentiometer 36 is applied via a resistor 42. A voltage divider having resistors 43, 44 is disposed between the outlet of the operational amplifier 41 and the ground. The coupling point of the resistors 43, 44, via a feedback resistor 45, is connected to the inverting input of the operational amplifier 41. The deviation that is amplified by the operational amplifier 41 reaches a three-point element which includes, especially, two oppositely poled Zener diodes 46, 47 that are connected in series and an operational amplifier 48. The Zener diodes are diposed between the outlet of the operational amplifier 41 and the inverting inlet of the operational amplifier 48, which is countercoupled via a resistor 49. A voltage divider having the resistors 51, 52 is disposed between the outlet of the operational amplifier 48 and the ground. The coupling point of the resistors 51, 52 is connected at the non-inverting inlet of the operational amplifier 48 which supplies a positive feedback. A condenser 53 is disposed between the non-inverting inlet of the operational amplifier 48 and the ground, with said condenser 53 preventing oscillations at the switch-over points of the three-point element. The three-point element, as known, has a three-point characteristic with a hysteresis as the transfer characteristic, in which case, the hysteresis, via the divisor relationship of the resistors 51, 52, can be adjusted arbitrarily. The switch-on points, on the other hand, are determined by the Zener voltage of the Zener diodes 46, 47. If the desired value and the actual value are the same, the control signal at the outlet of the operational amplifier becomes zero.

In the case of a positive control signal, a power transistor 56 is energized via a driving transistor 55, with a relay 57 being disposed in the collector-emitter circuit of said power transistor 56. Relay contact 58 is switched over. At the same time, a driving transistor 59 and a power transistor 60, assigned to said driving transistor 59, remain currentless. The relay contact 61 of the relay 62, located in the collector-emitter circuit of the transistor 60, remains in the switching position shown in FIG. 9. In this operational condition, positive potential is applied at one terminal 63 of the motor 2, while negative potential is located at the other terminal 64 of the motor 2. The motor 2 will run until the control signal at the output of the operational amplifier 48 becomes zero, and the relay 57 falls off. On the other hand, if the control signal exceeds a predetermined negative value, the transistors 59, 60 are energized, reversing the polarity of the voltage of the motor with respect to the operational condition explained above. The motor 2 will run in the opposite rotating direction until the deviation becomes zero again.

Figure 10:
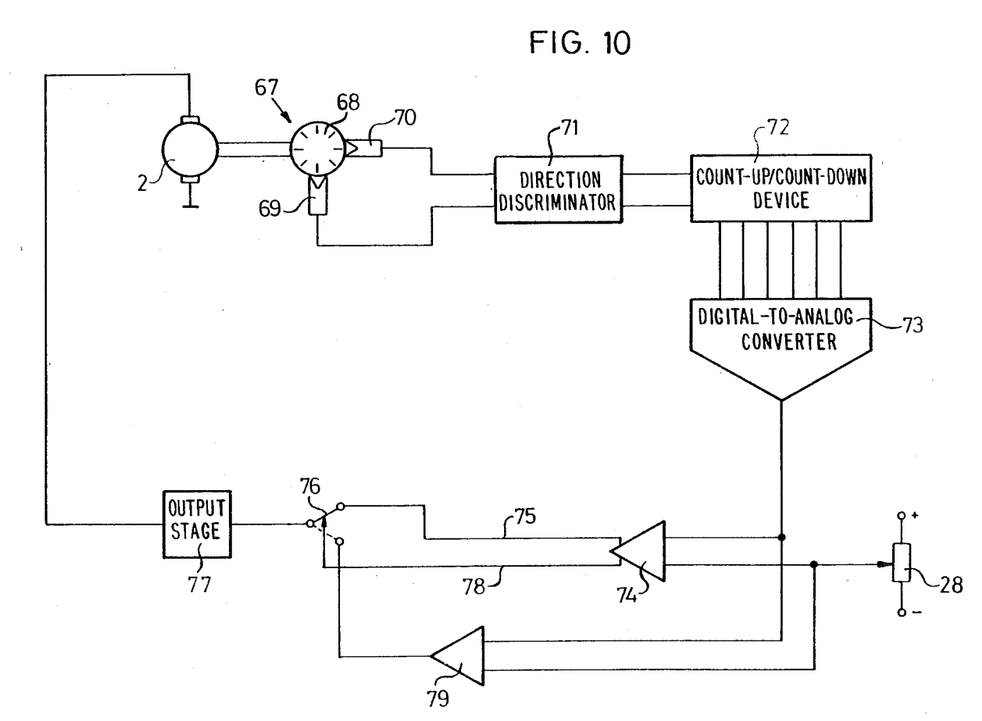
FIG. 10 shows a schematic diagram for an analog control circuit with a digital actual-value detection.

FIG. 10 shows a modified embodiment of the control circuit that utilizes digital actual-value detection. In this case, a digital position transmitter 67 is connected to the motor 2. Transmitter 67 may be designed as a mechanical, optical or magnetic position transmitter. FIG. 10 shows a graduated disk or a diaphragm disk 68 having two light barriers 69, 70, said disk being driven by the motor 2. The light barriers 69, 70 are connected to a direction discriminator 71 which determines the rotating direction of the motor 2 on the basis of the phase relation of the outlet signals of the light barriers 69, 70. A count-up/count-down device 72 is connected at the outlet side of the direction discriminator 71, with said device 72 counting the position signals of the position transmitter 67 in one rotating direction of the motor 2, e.g., the forward direction, and subtracting therefrom in the other rotating direction of the motor 2, i.e., the return direction. The counting device 72 is followed by a digital-to-analog converter 73 for converting the digital actual-value signal to an analog actual-value signal. In a window comparator 74, the analog actual-value signal is compared with the desired-value signal coming from the potentiometer 28. In the case of a deviation in one or the other direction that is outside the gate width of the comparator 74, a control signal, via a line 75 and a switching contact 76, goes to an electronic output stage 77 causing the motor 2 to rotate in one or the other direction. When the control signal of the comparator 74 becomes zero, the contact 76, via a line 78, is switched over to the outlet of a differential amplifier 79, which is also acted upon by the actual-value and the desired-value signal, but forms a precisely positioning circuit in order to, in the case of inadequate holding forces, counterbalance windforces affecting the cover 1. In this case, an electric motor 2 may, for example, be provided which, through the switching of motor windings, may be switched betweeen two speeds, the high speed step being connected to the coarsely positioning circuit having the comparator 74, and the low speed step being connected to the precisely positioning circuit having the differential amplifier 79, in order to carry out, in this manner, a coarse positioning with a high adjusting speed, as well as a precise positioning with a slow adjusting speed. A speed-regulating circuit may also be assigned to the motor 2, and the desired speed can be made a function of the extent of the deviation in the position-regulating circuit. In this manner, in the case of a large deviation of the desired position from the actual position of the cover 1, the cover can rapidly be brought into the proximity of the desired position, in order to then move into the desired position relatively slowly and with a correspondingly increased precision.

Figure 11:
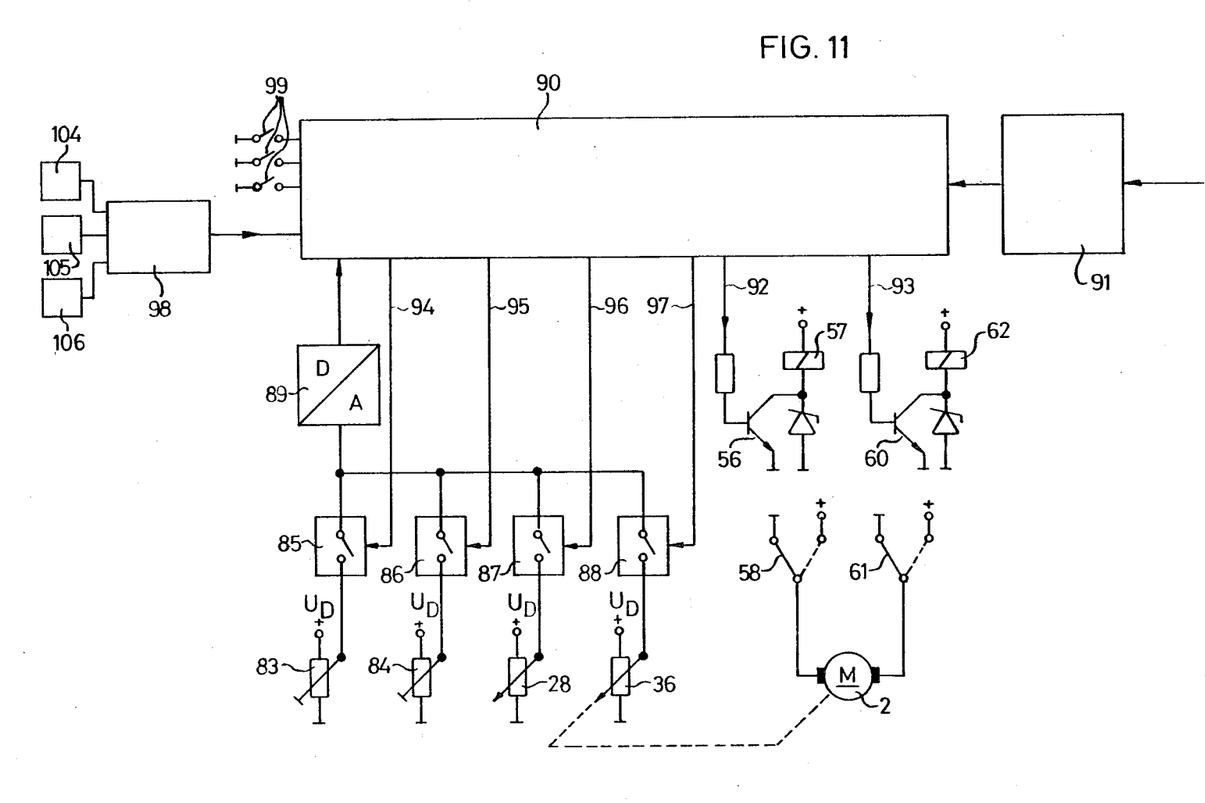
FIG. 11 shows a schematic diagram of an embodiment with analog transmitters and digital transmitter-signal evaluation.

In the case of the embodiment according to FIG. 11, the evaluation of the desired- and actual-position signals coming from the potentiometers 28 and 36, as well as from additional potentiometers 83, 84, is digital. For this purpose, the output sides of the potentiometers 28, 36, 83, 84, via electronic switches 85, 86, 87, 88 in a time-division multiplex operation, can be connected to an analog-to-digital converter 89, which converts the analog position signals into digital signals. Said digital position signals are admitted to a microcomputer 90. The microcomputer 90, which is fed from main power via a power-supply and clock stage 91, carries out the above-mentioned comparison of the desired and the actual position, and, in the case of corresponding deviations, supplies control signals, via control lines 92 or 93, to the power transistors 56 or 60. If necessary, the motor 2, via the contacts 58, 61 of the relays 57, 62, is made alive. The drive of the switches 85 to 88 takes place via control lines 94, 96, 96, or 97 by the microcomputer 90. By means of the potentiometers 83 and 84, <-> corresponding to predetermined cover positions, such as the closed position or the fully open position of the cover 1, are supplied. <desired-value signals>

At the input sides of the microcomputer 90, a logic circuit 98 and coding switches 99 are connected in order to trigger especially preprogrammed moving processes. For example, the logic circuit 98 may be actuated as a function of the ignition lock of the motor vehicle via a sensor 104 in order to, when the ignition lock is actuated, switch the input side of the analog-to-digital converter 89 from the potentiometer 28 to the fixed potentiometer 83, and, thus, irrespective of the user set adjusting position of the potentiometer 28, will transfer the cover 1, under the influence of the fixed desired-value signal of the potentiometer 83, automatically into the closed position. Such an automatic closing of the cover 1 may, for example, also be triggered by the logic circuit 98 on the basis of a rain sensor 105 that is connected with it so that the cover will close when it starts to rain. The logic circuit 98 may also be coupled with a jammingprotection sensor 106, which responds when movement of the cover 1 encounters excessive resistance. In this case, the microcomputer 90 causes a switching of the analog-to-digital converter 89 from the potentiometer 28 to the potentiometer 84 in order to move the cover 1 in the direction toward the fully opened position. The coding switches 99 permit an adaptation of the system to the various client demands regarding the individual operational sequences. The illustrated relay drive of the motor 2 can be replaced by any other suitable electronic power circuit.

In practice, the individual structural components of the described operating mechanism are, as a rule, furnished separately for assembly in series. This requires a modulation or adaption of the control circuit, especially the desired-value and the actual-value transmitters, and the part (cover 1) to be positioned. This adaption, in the case of the embodiment according to FIGS. 8 to 11, can expediently be achieved by electrically connecting the regulator 30 with the actual-value transmitter 36, the desired-value transmitter 28 and the motor 2. The desired-value transmitter 28 is brought into the desired starting position (zero-position). Then the supply voltage is applied and switched on. The motor 2 and the actual-value transmitter 36 will automatically go to the zero-position. Then, instead of the motor 2, a voltmeter is connected with the regulator, and the desired-value transmitter 28, which is still in zero-position, will be connected instead of the actual-value transmitter 36. Now the selector lever 14, together with the locked spring catch 23, is mechanically adjusted until there is no more voltage at the motor connections. The spring catch 23 will be fixed in this position. The original connections are restored. Finally, the drive is installed in the sliding-roof mechanism 3, 4, 5, which is in zero-position. After the coupling of the thus modulated control circuit with the roof mechanism, the installation is completed.

Figure 12:
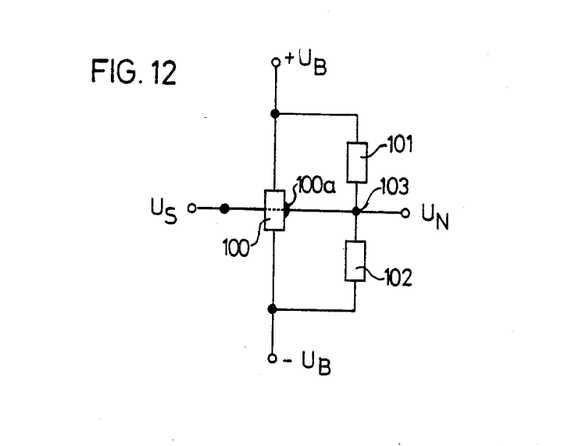
FIG. 12 shows a preferred embodiment of an analog desired-value transmitter.
Figure 13:
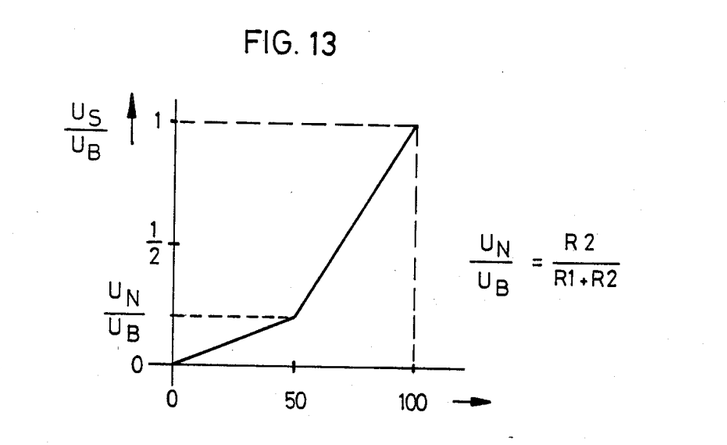
FIG. 13 shows a characteristic adjusting line of the desired-value transmitter according to FIG. 12.

The explained coordination can be simplified further when, instead of the potentiometer 28, a desired-value potentiometer 100, with a zero-position fixed tap 100a, is used and with which, according to FIG. 12, a voltage divider consisting of the resistors 101 and 102 is connected in parallel. The combined resistance R1+R2 of the voltage divider 101, 102 is low in comparison to the combined resistance P1 of the potentiometer 100. The tap 100a is connected with the voltage divider tap 103 in an electrically conductive manner, and the mechanical catch position (spring catch 23) is preadjusted in coordination with the tap 100a. Thus, the above-described adjusting of the control mechanism is not necessary. By means of a suitable selection of the values of resistance R1 and R2 of the resistors 101 and 102, the zero-position, in adaptation to the respective type of the roof, can be placed at any desired value of the control range of the desired-value transmitter, for example, in the center of this control range. The latter is indicated in the control characteristic according to FIG. 13. There, standardized with respect to the applied supply voltage $U_B$ of the potentiometer 100, the variable desired-position signal $U_S$ and the zero-position signal $U_N$, as a function of the percentage of the control range, are indicated. Provided that R1, R2<<P1, then $$\frac{U_N}{U_B} \text{ is } = \frac{R_2}{R1 + R2}.$$

The illustrated parallel connection of the potentiometer 100 and the voltage divider 101, 102, at the same time, provides an advantageous linearization of the control characteristic.

The tap 101a may, for example, be vacuum-metallized onto the potentiometer 100. However, it is also possible to make the arrangement such that the fixed tap 101a can be placed arbitrarily in the control range. In this case, an adjustment of the characteristic can be provided in the whole displayable range.

Naturally, numerous modifications are possible within the framework of the invention. The arrangement may, for example, be completely digital. In such a case, instead of the potentiometer 28, a coding switch, for example, may be provided as the desired-value transmitter. The motor 2 may be designed as an impulse-controlled step motor. The sliding clutch 31 represents a protection against jamming, which has the effect that the cover 1 stops when exceeding an indicated operational resistance. In this case, the actual value will not be lost because the actual-value transmitter is connected with the part of the sliding clutch 31 that is on the power take-off side. In addition to, or instead of, the sliding clutch 31, an electrical switch-off device may also be provided in order to discontinue the supply of power to the motor 2 in the case of excessive operational resistance. The described operating mechanism is also suitable for the adjusting of ventilating flaps and similar movable parts which selectively are to be brought into intermediate positions. Also included are lifting roofs, side windows that can be operated by window lifts, and lateral tilt-out windows.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein the actuating member has a selector lever located in the normal field of vision of a person operating an apparatus of which said movable part is a component.

2. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide wherein said desired-value transmitter or a selector lever thereof is provided with a mechanical catch for enabling a person operating same to recognize at least one position, intermediate ends of a path of movement thereof, in a tactile manner.

3. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein an indicating device showing the positional adjustment range of the movable part is associated with the selector lever.

4. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein the desired-value transmitter is operable for actuating said cover with respect to at least two different types of adjusting movements.

5. An operating system according to claim 4, wherein a selector switch is provided for the preselection of the type of adjusting movement and, by means of a single selector lever, the desired position in the course of all forms of the adjusting movement is selected.

6. An operating system according to claim 4, wherein the type of adjusting movement of the movable part is selectable by movement of the selector lever in respective directions relative to a predetermined starting position.

7. An operating system according to claim 6, wherein one of the desired-value transmitter and a selector lever thereof is provided with a mechanical catch for enabling a person operating same to recognize at least one position, intermediate ends of a path of movement thereof, in a tactile manner, said at least one tactilly recognizable position comprising said predetermined starting position.

8. An operating system according to claim 3, wherein the desired-value transmitter is operable for actuating said cover with respect to at least two different types of adjusting movements, and the indicating device is also provided with elements for indicating the type of adjusting movement selected.

9. An operating system according to claim 3, wherein the selector lever itself is part of the indicating device.

10. An operating system according to claim 9, wherein the selector lever is adjustable with respect to at least one fixed wedge representation, symbolizing adjustment range positions, of which said indicating device is comprised.

11. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein the control circuit has a three-point transfer characteristic with a hysteresis.

12. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein the control circuit has a coarsely regulating and a precisely regulating circuit and is switchable automatically from the coarsely regulating circuit to the precisely regulating circuit.

13. An operating system according to claim 1, wherein for at least one of the indication of the desired value and the detection of the actual value, an analog transmitter, such as a rotary- or slide-type potentiometer, is provided.

14. An operating system a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide wherein a digital transmitter is provided as either the desired-value transmitter or as a transmitter for the detected actual position value.

15. An operating system according to claim 14, wherein a count-up/count-down device is operative associated with the digital transmitter so as to receive the output thereof.

16. An operating system according to claim 15, wherein the control circuit comprises, in part, an analog control circuit.

17. An operating system according to claim 16, wherein a digital-to-analog converter is connected to receive the output of the count-up/count-down device, the analog control circuit being connected to receive the output of the digital-to-analog converter.

18. An operating system according to claim 13, wherein the control circuit comprises, at least partially, a digital control circuit.

19. An operating system according to claim 18, wherein an analog-to-digital converter is connected to receive the output of the analog transmitter.

20. An operating system for a movable part arranged for the selective closing or exposing of an opening, especially for sliding roofs and sliding/lifting roofs of motor vehicles, having a motor drive for the movable part and an actuating member for starting the drive when required, wherein the actuating member comprises a desired-value transmitter for selecting a desired position of the movable part and, with the motor drive, forms part of a control circuit which compares a position selected at the desired-value transmitter with a detected actual position of the movable part and adjusts the position of the movable part until the actual and desired positions of the movable part coincide, wherein at least one additional transmitter for determining a fixed desired value and a logic circuit responding to at least one predetermined condition for causing the motor drive to adjust the position of the movable part in correspondence to the fixed desired value of the additional transmitter instead of the selected desired value of the desired-value transmitter are provided.

21. An operating system according to claim 20, wherein the logic circuit is connected to at least one sensor that responds to a predetermined external condition.

22. An operating system according to claim 19, wherein a single analog-to-digital converter is connected so as to receive the output of a plurality of analog transmitters in time-division multiplex operation.

23. An operating system according to claim 7, wherein for at least one of the selection of the desired value and the detection of the actual value, an analog transmitter, such as a rotary- or slide-type potentiometer, is provided; and wherein the analog transmitter is a desired-value potentiometer provided with a fixed tap for producing a signal corresponding to the predetermined starting position.

24. An operating system according to claim 23, wherein a voltage divider with a resistance that is low in comparison to the combined resistance of the potentiometer is connected in parallel to the desired-value potentiometer and the fixed tap of the potentiometer is connected in an electrically conducting manner with a voltage divider tap for the starting position signal.

25. An operating system according to claim 2, wherein an analog transmitter, such as a rotary- or slide-type potentiometer, is provided as either the desired-value transmitter or as a transmitter for the detected actual position value.

26. An operating system according to claim 3, wherein an analog transmitter, such as a rotary- or slide-type potentiometer, is provided as either the desired-value transmitter or as a transmitter for the detected actual position value.

27. An operating system according to claim 4, wherein an analog transmitter, such as a rotary- or slide-type potentiometer, is provided as either the desired-value transmitter or as a transmitter for the detected actual position value.

28. An operating system according to claim 11, wherein an analog transmitter, such as a rotary- or slide-type potentiometer, is provided as either the desired-value transmitter or as a transmitter for the detected actual position value.

29. An operating system according to claim 12, wherein an analog transmitter, such as a rotary- or slide-type potentiometer, is provided as either the desired-value transmitter or as a transmitter for the detected actual position value.

30. An operating system according to claim 20, wherein an analog transmitter, such as a rotary- or slide-type potentiometer, is provided as either the desired-value transmitter or as a transmitter for the detected actual position value.

* * * * *